United States Patent [19]
Ito et al.

[11] Patent Number: 6,096,419
[45] Date of Patent: Aug. 1, 2000

[54] AROMATIC POLYAMIDE FILM AND MAGNETIC RECORDING MEDIUM USING THE SAME

[75] Inventors: Nobuaki Ito; Kazumasa Yoneyama, both of Shizuoka, Japan

[73] Assignee: Toray Industries, Inc., Japan

[21] Appl. No.: 09/180,846

[22] PCT Filed: Mar. 19, 1998

[86] PCT No.: PCT/JP98/01199

§ 371 Date: Nov. 24, 1998

§ 102(e) Date: Nov. 24, 1998

[87] PCT Pub. No.: WO98/42493

PCT Pub. Date: Oct. 1, 1998

[30] Foreign Application Priority Data

Mar. 21, 1997 [JP] Japan ..................................... 9-068489

[51] Int. Cl.$^7$ .............................. B32B 9/04; H01F 10/02; G11B 5/66; G11B 5/70

[52] U.S. Cl. ........................ 428/336; 428/409; 428/473.5; 428/694 R; 428/543; 428/900

[58] Field of Search ...................................... 428/336, 409, 428/473.5, 694 R, 543, 900

*Primary Examiner*—Bernard Pianalto
*Attorney, Agent, or Firm*—Austin R. Miller

[57] ABSTRACT

The present invention provides an aromatic polyamide film wherein a heat-shrinkage in the TD direction at 220° C. is of 0.2 to 8% under a load of 80 kg/cm$^2$, and wherein an average ten-point roughness Rz of the surface that is opposite to a surface for providing a magnetic layer is 10 to 200 nm; and a magnetic recording medium, wherein a magnetic layer is provided on a surface of the film. Since the heat-shrinkage at a high temperature and the properties of the surface of the film are within the confines of the present invention, there is obtained a magnetic recording medium having a high degree of flatness with small curls, and a high recording density by using the film.

7 Claims, No Drawings

AROMATIC POLYAMIDE FILM AND MAGNETIC RECORDING MEDIUM USING THE SAME

TECHNICAL FIELD

The present invention relates to an aromatic polyamide film and to a magnetic recording medium using the film.

BACKGROUND ART

Aromatic polyamide films are being investigated for a variety of uses which will allow benefit from advantages such as their heat-resistance and mechanical properties. In particular, para-oriented aromatic polyamides are superior to other polymers with respect to mechanical properties such as stiffness and strength and the like, so that they offer great advantage in making films thinner and they are also being investigated for use in printer ribbons, magnetic tapes, condensers and the like. With regard to magnetic recording media, these are disclosed in Japanese Unexamined Patent Publication No. 58-168655 and Japanese Unexamined Patent Publication No. 62-112218 and the like.

In the field of magnetic recording media, a metallic-thin-film-type magnetic recording medium seems to be showing promise in increasing recording density, wherein Co, Ni, Cr, or the like, is deposited on a substrate film by vacuum evaporation deposition, cathode sputtering, ion plating or the like to form the metallic-thin-film-type magnetic recording medium. The metallic-thin-film-type magnetic recording medium cannot only increase recording density in the film but can also make a magnetic layer thinner, so that the entire thickness of the recording medium becomes thin and the film can be made longer. The metallic-thin-film-type magnetic recording medium, therefore, is very useful in increasing storage capacity.

A heat-resistant film is useful for reducing damage caused by heat, because the magnetic recording medium is heated at the deposition of the magnetic layer. However, the film curls greatly, so that it is difficult to uncurl. To address this problem, for example, there is disclosed in Japanese Unexamined Patent Publication No. 56-16938 a range of heat-shrinkage rates which are necessary for uncurling the film at high temperature. It has, however, been clear that the above-disclosed range is not satisfactory in reproducibly providing a smooth magnetic tape.

An object of the present invention is to address the problem described above and to provide an aromatic polyamide film for reproducibly producing a smooth magnetic recording medium and a magnetic recording medium using the film while utilizing its high degree of stiffness and its heat-resistance.

DISCLOSURE OF INVENTION

The present invention provides an aromatic polyamide film wherein the heat-shrinkage rate is 0.2 to 8% in the TD direction at 220° C. under a load of 80 kg/cm$^2$ and the average ten-point roughness Rz on the surface that is opposite the surface for providing a magnetic layer is 10 to 200 nm, and also provides a magnetic recording medium wherein the magnetic layer is deposited on one surface of the film.

BEST MODE FOR CARRYING OUT THE INVENTION

An aromatic polyamide in accordance with the present invention preferably contains a repeating unit represented by the general formula (I) and/or (II) at not less than 50 mole percent, and more preferably not less than 70 mole percent;

the general formula (I)

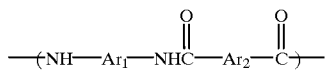

the general formula (II)

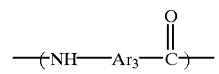

wherein examples of $Ar_1$, $Ar_2$, and $Ar_3$ are illustrated as follows;

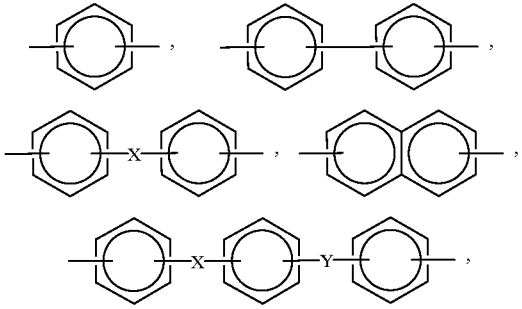

X and Y are selected from the group consisting of —O—, —CH$_2$—, —CO—, —SO$_2$—, —S—, and —C(CH$_3$)$_2$—, but they are not to be limited thereto. Further, some hydrogen atoms on the aromatic rings may have a substituent selected from the group consisting of a halogen group (particularly chlorine), a nitro group, an alkyl having from 1 to 3 carbon atoms (particularly methyl), and an alkoxy having from 1 to 3 carbon atoms. Still further, a hydrogen in an amide bond which form a polymer may have other substituents.

Characteristically, the polymers preferably contain above-described aromatic rings linked in para-oriented of not less than 50%, and more preferably not less than 70%, to obtain a high degree of stiffness and high heat-resistance of the film. Additionally, in order to decrease the moisture absorption rate, the polymers preferably contain aromatic rings, part of which some of the halogen atoms are replaced by halogen groups (particularly chlorine) in an amount of not less than 30%.

The preferred structure of the aromatic polyamide contains the following repeating unit at not less than 50 mole percent, and more preferably the aromatic polyamide contains the repeating unit of not less than 70 mole percent.

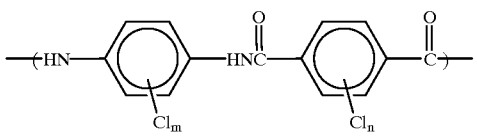

(wherein m and n indicate 0 to 4.)

The aromatic polyamide in accordance with the present invention preferably contains a repeating unit which is represented by the general formula (I) and/or (II) at not less than 50 mole percent. The balance of the repeating unit of the aromatic polyamides, which is not more than 50 mole percent, may be a copolymer (e.g. an aromatic polyimide), may be a blend of other polymers, or may be a blend with an electrically conducting particle, a slip additive, an antioxidant, or other additives at a degree of which the physical properties of the film are not impaired.

The thickness of the film in accordance with the present invention ranges preferably in a range of 1.5 to 10 μm, and more preferably in a range of 2 to 7 μm. When the thickness of the film is less than 1.5 μm, the strength as a tape is not satisfied. When the thickness of the film is more than 10 μm, miniaturization and extension of the recording time of the film tend to be difficult.

The film in accordance with the present invention has a heat-shrinkage rate of 0.2 to 8%, and preferably of 0.2 to 5% in the TD direction at 220° C. under a load of 80 kg/cm$^2$. When the heat-shrinkage rate is not more than 0.2%, uncurling is impossible. On the other hand, when the heat-shrinkage rate is not less than 8%, there is a problem that curling occurs in the opposite direction, or the film deforms gradually and the curling recurs during use, even though the uncurling have been performed once.

The requirement for the film in accordance with the present invention is that an average ten-point roughness Rz is in a range of 10 to 200 nm on the surface (hereinafter referred to as surface B) that is opposite the surface for forming a magnetic layer (hereinafter referred to as surface A), and preferably it is from 20 to 100 nm. The film is usually shrunk by being placed in contact with a heating-roll for uncurling. At this time, surface B is placed in contact with the heating-roll such that the magnetic layer is not impaired. When a value of Rz on surface B is less than 10 nm, friction between the film and the roll becomes great, so that the film does not uncurl, or uncurls unevenly. Thus, a flat magnetic recording medium cannot be reproducibly obtained. On the other hand, when the value of Rz of surface B is greater than 200 nm, the heated film deforms causing roughness of the magnetic surface. Additionally, the film slides too much on the roll, and the stability of the contact between the film and the roll decreases. Therefore, the friction coefficient of surface B of the film is preferably 0.1 to 2 for uncurling.

To maintain the roughness and the friction coefficient of surface B of the film in accordance with this invention, the film preferably contains particles. Examples of particles include inorganic particles such as $SiO_2$, $TiO_2$, $Al_2O_3$, $CaSO_4$, $BaSO_4$, $CaCO_3$, carbon black, zeolite, and other metal fine powders; and organic macromolecules such as silicon particles, polyimide particles, cross-linking copolymer particles, cross-linking polyester particles and Teflon particles. From the viewpoint of heat-resistance, inorganic particles are more preferred. An average particle diameter is preferably 0.01 to 2.0 μm, and is more preferably 0.05 to 0.5 μm. Besides, the content is preferably 0.01 to 10 wt %, and more preferably 0.1 to 5 wt %.

Properties of surfaces A and B may be the same or different. In the case of a metallic-thin-film-type, however, surface B is preferably rougher than surface A. The reduction in friction coefficient makes it possible to improve the running stability at the production of the magnetic recording medium and reproducibility in curling. The alteration of the properties of surfaces is well known, for example, in applying particles and binders on the surfaces, in laminating by a die or a laminating-tube, and the like.

An average roughness Ra of the magnetic surface is preferably 0.1 to 30 nm, and more preferably 0.2 to 10 nm.

The Young's modulus of the longitudinal direction of the film in accordance with the present invention is preferably not less than 1000 kg/mm$^2$. In addition, the film may be tensioned in the longitudinal direction, or in the transverse direction. Although the strength of the tension is not particularly determined, it is practical for the tensile Young's modulus $E_{MD}$ in the longitudinal direction and the tensile Young's modulus $E_{TD}$ in the transverse direction to be in the range of:

$$0.5 \leq E_{MD}/E_{TD} \leq 2$$

when properties such as elongation and resistance to tear are taken into consideration.

The ultimate elongation of the film in accordance with the present invention is preferably not less than 10%, more preferably not less than 20%, and most preferably not less than 30% to maintain an appropriate flexibility of the tape.

The moisture absorption rate of the film in accordance with the present invention is preferably not more than 4%, more preferably not more than 3%, and most preferably not more than 2%. The lower the moisture absorption rate, the smaller the change in size of the tape caused by change in humidity, so that electromagnetic transducing ability holds high, and it is desirable.

Further, the film in accordance with the present invention is satisfactorily available for an metallic-thin-film-type magnetic recording medium, and is also available for a magnetic recording medium of iron oxides or metal powders applied together with a binder. Thus, the film is effective in controlling curling as in the case of the metallic-thin-film-type magnetic recording medium.

The magnetic recording medium in accordance with the present invention is a film as described above being provided with a magnetic layer thereon. The total thickness of the magnetic recording medium is preferably not more than 10 μm, more preferably not more than 7 μm, and most preferably not more than 5 μm, since a great thickness prevents miniaturization.

The thickness of the magnetic layer is preferably not more than 2 μm, and more preferably not more than 1 μm. Although the thinner the magnetic layer the better the recording performance for a short wavelength, a reduction in the output occurs when the magnetic layer is too thin. The limitation in terms of smallest size of the magnetic layer is therefore usually not less than 0.1 μm. As possible materials for use in the magnetic layer, metals such as Ni, Cr, Fe, and Co, and alloys thereof are included, but not limited thereto.

With regard to the magnetic recording medium, a back-coating layer is usually preferably provided. In the case of the metallic-thin-film-type, the back-coating layer is preferably provided after the uncurling. The thickness of the back-coating layer is preferably not more than 1 μm.

Additionally, a protecting layer may be provided on the magnetic layer to improve durability. Examples of the protecting layer include a carbon layer and a lubricant layer, and may be provided alone or as a composite of several layers.

Next, a method for producing the aromatic polyamide film and the magnetic recording medium using the film in accordance with the present invention is described as follows, but not limited thereto. Initially with regard to the aromatic polyamide, when the aromatic polyamide is prepared from acid chlorides and diamines, synthesis is conducted by means of a solution polymerization in an aprotic organic polar solvent such as N-methylpyrrolidone (NMP), dimethylacetamide (DMAc); dimethylformamide (DMF), or by means of a interfacial polymerization using a solution medium; and the like. When acid chlorides and diamines are used as monomers, hydrogen chloride is produced in a polymer solution as a by-product. In order to neutralize the hydrogen chloride, there is used an inorganic neutralization agent such as calcium hydride, lithium hydride, calcium carbonate, and lithium carbonate; and an organic neutralization agent such as ethylene oxide, propylene oxide, ammonia, triethylamine, triethanolamine, and diethanolamine. Besides, a reaction of isocyanato with carboxylic acid affords in the aprotic organic polar solvent in the presence of catalyst.

This polymer solution may be used for a stock solution for forming a film as is; or a stock solution for forming a film is prepared by once isolating a polymer and then dissolving the polymer again in an organic solvent described above or an inorganic solvent such as sulfuric acid.

To obtain the aromatic polyamide film in accordance with the present invention, the inherent viscosity of the polymer (the value measured at 30° C. when 0.5 g of the polymer is dissolved in sulfuric acid to make a solution of 100 ml) is preferably not less than 0.5.

A solubilizer may be added to the stock solution, and examples of the solubilizer include calcium chloride, magnesium chloride, lithium chloride, and lithium nitrate. The concentration of the polymer in the stock solution is preferably 2 to 40 wt %.

As a method for adding particles, there is a method in which particles are satisfactorily changed into slurry in a solvent at a preliminary stage, and then the resulting solvent is used as a solvent for polymerization or a solvent for dilution; a method in which particles are directly added after the preparation of the stock solution; and the like.

As described above, the film is produced with the prepared stock solution by means of a solution film-producing method. With regard to the solution film-producing method, there are wet and dry, dry, and wet processes, and the like. Although any one of the processes may be available, the wet and dry process is described as an example hereinbelow.

With regard to the wet and dry process, the stock solution is extruded from the die on the supporting member such as a drum and a continuous belt made of nickel, stainless steel, copper, titanium, Hastelloy, tantalum and the like, to form a thin-film. Then, a solvent is evaporated from the thin-film layer so that the thin-film is dried and has self-retentivity. The dry process is conducted under conditions ranging from room temperature to 250° C. and within 60 minutes, and preferably conducted under conditions ranging from room temperature to 200° C. When the drying temperature is beyond 250° C., the film is developed with a void and a roughness of the surface caused by rapid heating, so that a practical film cannot be obtained.

After the dry process described above has finished, the film is peeled from the supporting member to introduce the wet process. In the wet process, the solvent and impurities which have contaminated the film are removed. Generally, a bath is filled with an aqueous medium, and may include an organic solvent, an inorganic salt, and the like, besides water. In general, the content of water, however, is preferably not less than 30%, and more preferably not less than 50%. The bath is usually used at 0 to 100° C. Additionally, it is effective in reducing the amount of impurities in the film to increase the temperature of the bath to more than 50° C., or to pass it through an organic solvent bath.

After the dry process of the film has finished, the film is further dried and stretched. The dry and the stretching process is carried out at a temperature of 250 to 400° C., and at a stretching ratio represented by an area ratio of 0.8 to 5.0 (the area ratio is defined as the value of the area of a film after the stretching process divided by the area of the film before the stretching process; a value under 1 means relaxation). A more preferred stretching ratio is 1.1 to 3.0. Further, to maintain the heat-shrinkage in the TD direction within the range of the present invention, the film is preferably obtained by stretching again in the TD direction at a temperature that is less than the temperature of the stretching process, and then by the film being chilled rapidly at a rate over 200° C./second.

The alteration of the properties of surface A and B is carried out by a conventional method, for example, in applying particles and binders onto the surfaces, in laminating a polymer solution containing other particles by a die or a laminating-tube, and the like.

Next, a magnetic layer is provided on the film. In providing a metallic-thin-film, it is effective for improving adhesive strength between the film and the magnetic layer that a glow discharge process or a corona discharge surface treatment is conducted on the surface A before providing the metallic-thin-film.

Still further, a magnetic layer is provided by means of vacuum evaporation deposition, cathode sputtering, and the like. In this case, curls often occur such that surface A faces inwardly, but uncurling is necessary to use the film as a magnetic recording medium. To obtain greater productivity and stability, the film is preferably placed in contact with a heating-roll at surface B so as to shrink the film by heating and uncurl the film. Additionally, since surface B is placed in contact with a roll, the magnetic layer is not damaged. The uncurling is preferably performed completely so as to be flat. However, there is no problem with curls remaining to some degree, as long as contact between the magnetic surface and a magnetic head is properly maintained. Additionally, when the height of a curl is small, the direction of the curl, that is, inwardly or outwardly, causes no problem.

Still further, after the uncurling, a back-coating layer is preferably provided on the opposite surface of the magnetic layer by a conventional method. After these processes, the film is slitted to produce a magnetic recording medium in accordance with the present invention.

Measuring Method and Evaluating Method

Measuring method for physical properties and evaluating method for effects of a magnetic recording medium in accordance with the present invention are described as follows.

(1) Average Ten-point Roughness Rz

Surface roughness is measured five times using Micro Figure Measuring Instrument (ET-10) (manufactured by Kosaka Kenkyuhsyo) under conditions in which the tip radius of a probe is 0.5 $\mu$m, the load of the probe is 5 mg, the cut-off value is 0.008 mm, and the measuring length is 0.5 mm; and then Rz is represented as an average value.

(2) Heat-shrinkage

A long sample is slitted in the TD direction having a width of 10 mm and a length of 250 mm and bench marks are marked at intervals of 200 mm. After the film is loaded such that there is 80 kg/cm$^2$ per cross-section of the film in the TD direction and heated in an oven for 10 minutes at 220° C., the film is taken off and the intervals between the bench marks are measured. The heat-shrinkage is determined by the change from the length before to that after heating.

(3) Friction Coefficient

A chrome-plated metal pin having a diameter of 8 mm and a length of 30 mm (surface roughness is 0.4 S) is placed in contact with surface B of the slitted film having a width of 10 mm, and then the film is run. The friction coefficient is determined by its tension.

(4) Uncurling

The evaluation is conducted under the condition that a magnetic layer is provided and a back-coating layer is not provided.

Surface B of the film is placed in contact with a heating-roll having a surface roughness of 0.2 S with the roll being heated to 220° C., at a tension of 50 kg/cm$^2$ in the MD direction for not less than 0.3 seconds.

(5) Evaluation of Curls of a Magnetic Recording Medium

A sample after uncurling is slitted in the MD direction and a tape having a width of 3.8 mm is produced. A sample having a length of 2 cm is taken off from the tape and is allowed to stand at 25° C. in an atmosphere of 55% RH for 2 hours and then is placed on a horizontal plane.

A. Direction of Curls

A curl wherein the magnetic layer is inside the film represents "+", and a curl wherein the magnetic layer is outside the film represents "−".

B. Height of Curls

The height of the curls is determined by measuring the highest point of the tape from a horizontal plane. "○" represents a height of curls of not more than 1 mm, "Δ" represents a height of 1 to 2 mm, and "×" represents a height of not less than 2 mm.

C. Reproducibility

Uncurling is conducted five times and "×" represents a magnetic recording medium which has a height of curls not less than 2 mm or more than two occasions.

EXAMPLES

The present invention is described according to examples as follows, but the description is not to be construed as restrictive.

Example 1

Into a polymerization reservoir, N-methyl-2-pyrrolidone (NMP) having a moisture content of 45 ppm was introduced, and 2-chloroparaphenylenediamine (85 mole percent) as an aromatic diamine component and 4,4'-diaminodiphenyl ether (15 mole percent) were dissolved in the NMP. Into the solution, 2-chloroterephthaloyl chloride (98.5 mole percent) was added, and stirred for two hours, and then the polymerization was ended. Of the produced hydrogen chloride, 97 mole percent was neutralized by lithium hydroxide, 6 mole percent of diethanolamine was added to the solution, and then a polymer solution was obtained.

The polymer solution was divided into two portions.

A slurry was added to one portion such that the amount of the particle was 1.5 wt % of the polymer, wherein the slurry included a dry-type silica particle having an initial particle size of 0.02 μm and was dispersed into NMP to give an average particle size of 0.3 μm. Then, the solution was adjusted to give a polymer concentration of 11 wt % and a solution viscosity of 4000 poise at 30° C. to obtain a stock solution for forming a film (hereinafter B solution).

To the other portion of the polymer solution, 0.1 wt % of monodisperse particles having an initial particle size of 0.05 μm was added. Then, the solution was adjusted to give a polymer concentration of 11 wt % and a solution viscosity of 4100 poise at 30° C. to obtain another stock solution for forming a film (hereinafter A solution).

After both solutions A and B were passed through a 3 μm cut filter, the solutions were mixed in the die such that the final thickness of the film was 2.5 μm at the solution-A side and 2 μm at the solution-B side. Then, the mixed solution was cast from the die onto a metal belt in such a manner that the solution B was brought into contact with the surface of the belt. The cast film was heated with hot air at 140° C. for 3 minutes so as to evaporate the solvent. Then, the film having self-retentivity was continuously peeled off from the belt. Next, the film was introduced into a water bath to extract inorganic salts and the like produced by the neutralization with the remaining solvent. Incidentally, the film stretched 1.2 times towards the longitudinal direction (the MD direction) in the bath.

And then, the film was introduced into a tenter to evaporate water at 300° C. and to conduct a heating process, while the film was stretched 1.4 times in the transverse direction. Further, the film was stretched 1.03 times in the TD direction at 200° C., and then, the film was transferred to a cooling room at 50° C. in 0.5 seconds and cooled rapidly. The thickness of the resultant film was 4.5 μm and the properties of the film were indicated in Table 1. Additionally, the film had a moisture absorption rate of 1.5%. A surface roughness Ra on the surface A was 1 nm, and that on surface B was indicated in Table 1. In addition, the Young's modulus of the film in the MD direction was 1300 kg/mm$^2$, and that in the TD direction was 1400 kg/mm$^2$.

Then, after surface A of the film was cleaned by means of a glow discharge process, Co/Ni (composition ratio: 80/20%) was deposited with a thickness of 0.2 μm by means of the vacuum evaporation deposition. The resulting film curled greatly towards the deposited surface. Therefore, the film was placed in contact with a heating-roll at 220° C. and was uncurled. The results are shown in Table 1. The resulting magnetic tape had small curls and had a satisfactory quality.

Example 2

The film was produced using the same two polymer solutions as those used in Example 1 and by the same method as that in Example 1. To solution B, the same particles as those used in Example 1 were added at a volume of 0.5 wt % and a film having a thickness of 4.5 μm was obtained. Further, a deposited layer was formed on the film and uncurling was conducted, so that the quality of the film was satisfactory. The results were shown in Table 1.

Example 3

The film was produced by using the same solutions A and B as those in Example 1. After the film was stretched 1.4 times in the TD direction at 300° C., the film was further stretched 1.02 times in the TD direction at 200° C. Then, the film was transferred to a cooling room at a temperature of 40° C. in 0.5 seconds and was cooled rapidly. Further, a deposited layer was formed on the film and uncurling was conducted, so that the quality of the film was satisfactory. The results were shown in Table 1.

Example 4

The film was produced by the same method described in Example 1. The depositing process was conducted so as to obtain a surface A having a thickness of 2.2 μm and a surface B having a thickness of 1.2 μm, so that the resultant film had a thickness of 3.4 μ. In the process for producing the film, the film was further stretched 1.05 at 200° C. after the first stretch, and then, the film was cooled to 40° C. in 0.5 seconds to obtain the final product. The properties of the resulting film were shown in Table 1. Additionally, the film provided with a magnetic layer was uncurled. As shown in Table 1, the quality of the film was satisfactory.

Comparative Example 1

A film was formed by the same method described in Example 1. When the film was stretched again 1.05 times at 320° C. after first stretch, the heat-shrinkage in the TD direction was small as shown in Table 1.

The uncurling was not satisfactory.

Comparative Example 2

A film was formed by the same method described in Example 1. When the film was stretched again 1.1 times at 200° C. after first stretch, the heat-shrinkage in the TD direction was significantly large as shown in Table 1. Although uncurling was conducted, the film curled toward the opposite direction. As a result the flatness of the film was poor.

Comparative Example 3

The film was produced by the same method described in Example 1, except that the amount of particles added to a surface B portion of the stock solution was 0.1%. Although uncurling was conducted, the surface was smooth and the uncurling was unstable as shown in Table 1, so that the reproducibility was not satisfactory.

TABLE 1

| | Substrate film | | | | Curls of magnetic tape | | |
|---|---|---|---|---|---|---|---|
| | | Heat-shrinkage | | | | | |
| | Thickness (μm) | in TD direction (%) | Rz (nm) | μK (−) | Direction | Height of curls | Reproducibility |
| Example 1 | 4.5 | 1.5 | 69 | 0.27 | + | ○ | ○ |
| Example 2 | 4.5 | 1.5 | 25 | 0.50 | + | ○ | ○ |
| Example 3 | 4.5 | 0.9 | 63 | 0.28 | + | ○ | ○ |
| Example 4 | 3.4 | 2.6 | 70 | 0.30 | − | ○ | ○ |
| Comparative example 1 | 4.5 | 0.1 | 58 | 0.25 | + | x | x |
| Comparative example 2 | 4.5 | 8.3 | 72 | 0.26 | − | x | x |
| Comparative example 3 | 4.5 | 1.3 | 7 | 2.3 | + | x to ○ | x |

Industrial Applicability

A magnetic recording medium having a high degree of flatness with small curls and a high recording density is produced by using an aromatic polyamide film in accordance with the present invention.

What is claimed is:

1. An aromatic polyamide film having a heat-shrinkage in the TD direction at 220° C. of 0.2 to 8% under a load of 80 kg/cm², and an average ten-point roughness Rz on a surface that is opposite to a surface for providing a magnetic layer of 10 to 200 nm.

2. An aromatic polyamide film according to claim 1, wherein the friction coefficient of said surface that is opposite to a surface for providing a magnetic layer is in a range of 0.1 to 2.

3. An aromatic polyamide film according to claim 1, wherein said heat-shrinkage in the TD direction at 220° C. is 0.2 to 5% under a load of 80 kg/cm².

4. An aromatic polyamide film according to claim 1, wherein a layer which forms said surface that is opposite to a surface for providing a magnetic layer includes particles having an average particle diameter of 0.01 to 2.0 μm over a range from 0.01 to 10 wt %.

5. An aromatic polyamide film according to claim 1, wherein the tensile Young's modulus $E_{MD}$ in the longitudinal direction and the tensile Young's modulus $E_{TD}$ in the transverse direction satisfy the relationship:

$$0.5 \leq E_{MD}/E_{TD} \leq 2$$

6. An aromatic polyamide film according to claim 1, wherein a moisture absorption rate is not more than 4%.

7. A magnetic recording medium, comprising an aromatic polyamide film according to any one of claims 1 to 6, wherein a magnetic layer is provided on a surface of said aromatic polyamide film.

* * * * *